(12) United States Patent
Petti

(10) Patent No.: US 11,741,293 B2
(45) Date of Patent: *Aug. 29, 2023

(54) SYSTEMS AND METHODS OF A SCRIPT GENERATION ENGINE

(71) Applicant: Open Text SA ULC, Halifax (CA)

(72) Inventor: Gregory R. Petti, Calgary (CA)

(73) Assignee: OPEN TEXT SA ULC, Halifax (CA)

( * ) Notice: Subject to any disclaimer, the term of this patent is extended or adjusted under 35 U.S.C. 154(b) by 44 days.

This patent is subject to a terminal disclaimer.

(21) Appl. No.: 17/558,070

(22) Filed: Dec. 21, 2021

(65) Prior Publication Data

US 2022/0114329 A1 Apr. 14, 2022

Related U.S. Application Data

(63) Continuation of application No. 16/530,624, filed on Aug. 2, 2019, now Pat. No. 11,227,097, which is a
(Continued)

(51) Int. Cl.
*G06F 40/00* (2020.01)
*G06F 40/143* (2020.01)
(Continued)

(52) U.S. Cl.
CPC .............. *G06F 40/143* (2020.01); *G06F 8/40* (2013.01); *G06F 40/151* (2020.01); *G06F 8/41* (2013.01);
(Continued)

(58) Field of Classification Search
CPC ........ G06F 40/143; G06F 40/151; G06F 8/40; G06F 40/154; G06F 8/41; G06F 9/45512; G06F 9/44
See application file for complete search history.

(56) References Cited

U.S. PATENT DOCUMENTS 5,953,735 A * 9/1999 Forcier .................. G06F 40/10
715/863
6,857,124 B1 * 2/2005 Doyle ................. G06F 9/44526
709/203
(Continued)

OTHER PUBLICATIONS

Fatwire, "Fatwire|Content Server 7: Administrator's Guide," Jun. 15, 2011, 576 pages (Year: 2011).*
(Continued)

*Primary Examiner* — William L Bashore
*Assistant Examiner* — David Faber
(74) *Attorney, Agent, or Firm* — Sprinkle IP Law Group

(57) ABSTRACT

A template built by a user may be converted by a Server Script Generation Engine (SSGE) into script code. In converting, the SSGE may load and parse a framework file containing static script syntax to locate insertion points, each associated with an iteration number, and may iteratively parse the template, utilizing the iteration number to resolve, in order, tags and sub-tags contained in the template. If a tag is set to respond to the iteration number, a function of the tag is invoked to process any related sub-tags and return a script associated therewith at the appropriate insertion point. The framework file (with the appropriate script code inserted) is compiled and stored in a compiled script object which can be run multiple times to perform all of the output functions expected by the user in lieu of the need to reconvert the template.

20 Claims, 9 Drawing Sheets

Related U.S. Application Data continuation of application No. 13/917,767, filed on Jun. 14, 2013, now Pat. No. 10,417,314.

(60) Provisional application No. 61/659,696, filed on Jun. 14, 2012.

(51) Int. Cl.
| | | |
|---|---|---|
| *G06F 8/40* | (2018.01) | |
| *G06F 40/151* | (2020.01) | |
| *G06F 9/44* | (2018.01) | |
| *G06F 8/41* | (2018.01) | |
| *G06F 9/455* | (2018.01) | |
| *G06F 40/154* | (2020.01) | |

(52) U.S. Cl.
CPC ............ *G06F 9/44* (2013.01); *G06F 9/45512* (2013.01); *G06F 40/154* (2020.01)

(56) References Cited

U.S. PATENT DOCUMENTS

| | | | | |
|---|---|---|---|---|
| 7,188,158 | B1* | 3/2007 | Stanton | G06F 9/541 709/220 |
| 7,421,484 | B2* | 9/2008 | Das | H04L 41/0843 709/227 |
| 7,966,083 | B2* | 6/2011 | Moorer | H04L 12/2818 700/19 |
| 8,121,874 | B1* | 2/2012 | Guheen | G06Q 10/087 705/28 |
| 8,122,102 | B2* | 2/2012 | Wein | H04L 61/4552 709/219 |
| 8,479,153 | B2* | 7/2013 | Jerman | G06F 8/35 717/136 |
| 8,612,933 | B1* | 12/2013 | Gill | G06F 8/30 717/110 |
| 8,640,093 | B1* | 1/2014 | Gill | G06F 9/44 717/121 |
| 9,201,631 | B2* | 12/2015 | Friedman | G06F 40/151 |
| 2002/0065849 | A1* | 5/2002 | Ferguson | H04L 9/40 715/227 |
| 2002/0194219 | A1* | 12/2002 | Bradley | G06F 40/117 725/9 |
| 2003/0120665 | A1* | 6/2003 | Fox | G06F 16/288 |
| 2004/0268249 | A1* | 12/2004 | Fennelly | G06F 16/258 715/236 |
| 2005/0102611 | A1* | 5/2005 | Chen | G06F 40/166 707/E17.117 |
| 2005/0120347 | A1* | 6/2005 | Asare | G06F 8/76 717/172 |
| 2005/0155027 | A1* | 7/2005 | Wei | G06F 8/61 717/176 |
| 2006/0095835 | A1* | 5/2006 | Kennedy | G06Q 30/06 715/764 |
| 2007/0266176 | A1* | 11/2007 | Wu | G06F 40/154 707/E17.121 |
| 2007/0277099 | A1* | 11/2007 | Nakayama | G06F 16/972 707/E17.117 |
| 2008/0313282 | A1* | 12/2008 | Warila | G06F 3/0482 717/172 |
| 2009/0063619 | A1* | 3/2009 | Chijiiwa | G06F 16/958 709/203 |
| 2009/0210790 | A1* | 8/2009 | Thomas | H04N 21/8545 715/719 |
| 2010/0064277 | A1* | 3/2010 | Baird | G06F 8/72 717/120 |
| 2010/0100868 | A1* | 4/2010 | Shukla | G06F 8/34 717/109 |
| 2011/0191667 | A1* | 8/2011 | Sahota | G06F 40/103 715/234 |
| 2011/0238651 | A1* | 9/2011 | Glazer | G06F 16/48 707/706 |
| 2011/0239109 | A1* | 9/2011 | Nixon | G06F 40/154 715/236 |
| 2011/0246444 | A1* | 10/2011 | Jenkins | G06F 9/451 707/711 |
| 2012/0062577 | A1* | 3/2012 | Nixon | G05B 23/0272 345/522 |
| 2012/0078968 | A1* | 3/2012 | Nixon | G06F 16/14 707/E17.055 |
| 2012/0102483 | A1* | 4/2012 | Goldman | G06F 9/445 717/174 |
| 2012/0137211 | A1* | 5/2012 | Lewontin | G06F 40/154 715/236 |
| 2012/0137233 | A1* | 5/2012 | Lewontin | G06F 16/9577 715/760 |
| 2012/0266142 | A1* | 10/2012 | Bokhari | G06F 11/3688 717/127 |
| 2013/0212462 | A1* | 8/2013 | Athas | G06F 16/9577 715/234 |
| 2013/0326333 | A1* | 12/2013 | Hashmi | G06F 16/958 715/234 |
| 2013/0339841 | A1* | 12/2013 | Petti | G06F 40/151 715/234 |
| 2014/0181633 | A1* | 6/2014 | Mo | G06F 16/958 715/234 |

OTHER PUBLICATIONS

Friesen, Jeff, "Beginning Java™ SE 6 Platform: From Novice to Professional", 2007, 511 page.*

Fatwire, "Web Experience Management Framework, Version 1.1, Developer's Guide" Mar. 28, 2011, 98 pages.*

* cited by examiner

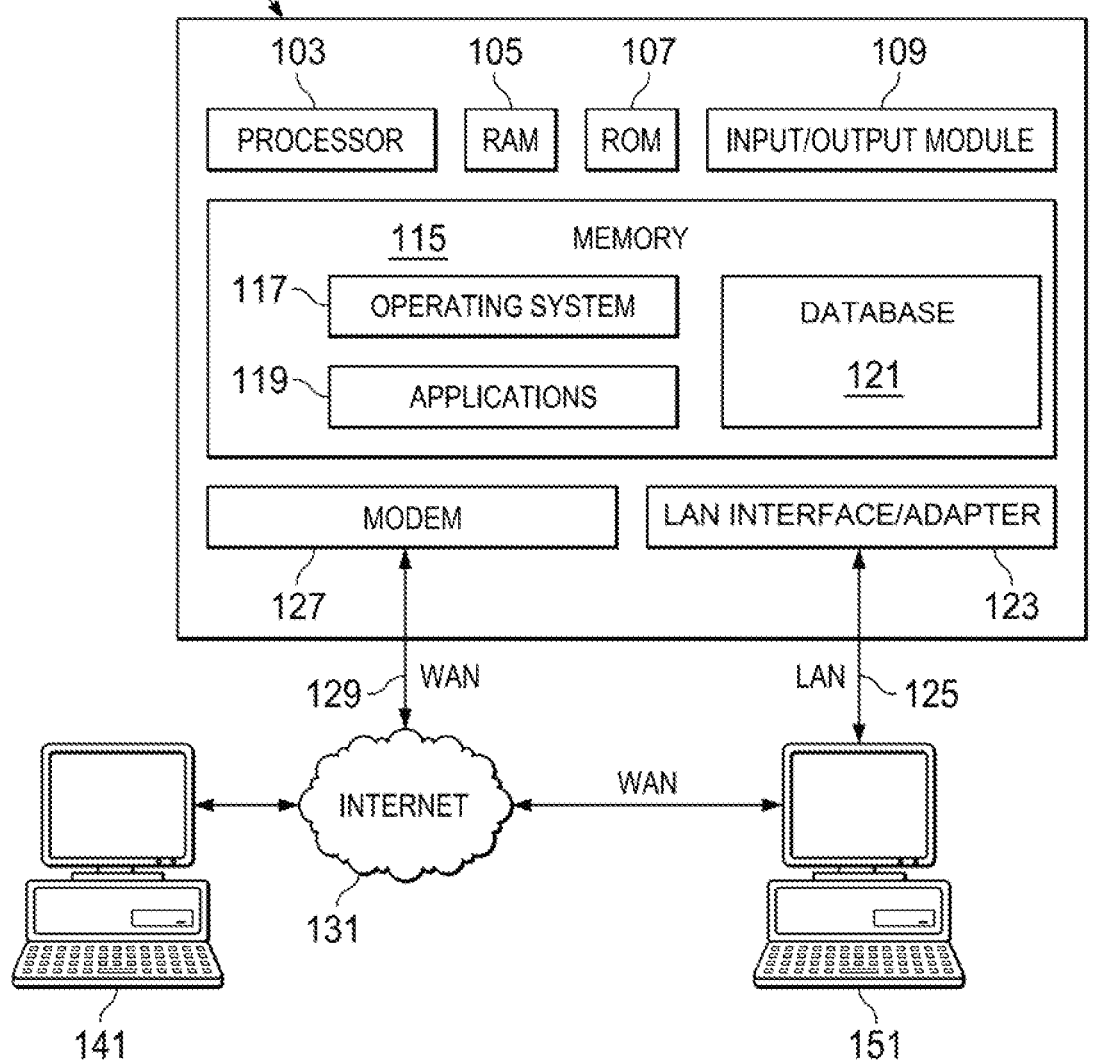

Header Section 410

```
[/*
Template
        Title: ActiveView Browse View with flexible columns (Includes 9.7.1 style pagination) - Sample
        Version 2.6
        Modified: Feburary 9, 2010
        Uses new SORT and BYCACHEURL syntax - only works with 5.0.1
        This reportview requires that a default sort column is set in the Parameters tab (e.g. sort=name)
*/]
<!--WebReports version: [LL_REPTAG SUBVERSION /]-->
[LL_REPTAG_MYCACHEURL SETVAR:BaseURL /]
[// create the style for alternate row colors using the USERPREF subtag:
<style>
        .userRow1 { background-color: [LL_REPTAG_USERID USERPREF:COLORS:ROW1 /]; }
        .userRow2 { background-color: [LL_REPTAG_USERID USERPREF:COLORS:ROW2 /]; }
</style>
```

430    440

Row Section 420

```
[LL_WEBREPORT_STARTROW /]
[// We haven't defined any parms in this syntax (@PARMNAME SORTCOL:nnnnnnn  SORTDIR:nnnnnnn) so the default is &sort= and &direction=
[LL_WEBREPORT_SORT @PREDEFKEY REF:SIZE PARM: "[LL_REPTAG=DATAID NODEINFO:SIZE /]" /]
[LL_WEBREPORT_INCLUDEIF "[LL_REPTAG_&filterValue /]" IN "[LL_REPTAGname /]" AND "[LL_REFTAG_&objfilter /]"
IN "[LL_REPTAG=SUBTYPE /]" /]
[// Add any special filters here
[// Pagination control
[LL_WEBREPORT_INCLUDERANGE STARTROW: [LL_REFTAG_&STARTROW DEF:1 /] MAXROWS: [LL_REPTAG %NUMROWS CURRENTVAL /] /]
[// Sample filter to exclude appearances. Hiding appearances has the same effect but this filter can be used too. Uncomment to use.
[// [LL_WEBREPORT_INCLUDEIF "[LL_REPTAG=SUBTYPE /]<> "480" /]
```

FIG. 5

```
//----------- Compiled ReportView
function Object RKTEngineExecute (Object stp)
*/--FUNCTIONHEADER-----------*/
  Object prgCtx = stp.fPrgCtx
  Object request = stp.fRequest
  Object rdp = stp.RowDataProcessor ()
  Integer fieldCount = rdp.fFieldCount
  Dynamic iterator
  stp.fOutputIteration = false
  String s
  Record rec integer srn=0
  for rec in rdp.fRowData
     rec._SOURCEROWNUM = (srn=srn+1)
  end s += stp.SetData (stp.LL_REPTAG_MYCACHEURL().SETVAR({"BaseURL"}).GetData ()
  s += stp.SetData (stp.GetVarValueFinal ("BaseURL")).CURRENTVAL ({}).SETVAR ({"FilterURL"}).GetData ()
  s += stp.SetData ("&searchname=").CONCATVAR({"FilterURL"}).GetData()
  s += stp.SetData (stp.GetParameter ("SEARCHNAME")).CONCATVAR({"FilterURL"}).GetData ()
  s += stp.SetData ("&obj Filter=").CONCATVAR({"FilterURL"}).GetData ()
  s += stp.SetData (stp.GetParameter ("objFilter")).CONCATVAR ({"FilterURL"}).GetData ()
  s += stp.SetData (stp.Get.Parameter ("STARTROW")).PATCHANGE({"<?+>", "@&startrow=#1"}).CONCATVAR({"FilterURL"}).G
  s += stp.SetData (stp.Get.Parameter ("NUMROWS")).PATCHANGE ({"<?+>", "@&numrows=#1"}).CONCATVAR ({"FilterURL"}).Get
  s += stp.SetData (stp.LL_REPTAG_MYCACHEURL().ESCAPEURL({}).SETVAR ({"myNextURL"}).GetData ()
  if stp.evaluate (stp.GetParameter ("NUMROWS"), "==", "")
```

| | Type | Name | Size | Modified |
|---|---|---|---|---|
| ☐ | W | Most Active Projects In The Last Week | | 08/02/2010 08:50 PM |
| ☐ | W | Least Active Projects In The Last Week | | 08/02/2010 08:50 PM |
| ☐ | W | Documents With The Most Versions | | 08/02/2010 08:50 PM |
| ☐ | W | Most Active Projects In The Last Week | | 09/02/2010 08:30 PM |
| ☐ | W | Least Active Projects In The Last Week | | 09/02/2010 08:30 PM |
| ☐ | W | Documents With The Most Versions | | 09/02/2010 08:30 PM |
| ☐ | W | TCDATA-400-ASSOC ATTR DATA | 1 KB | 10/28/2010 07:46 PM |
| ☐ | W | TCDATA-SUBTAG NODEINFO-Sample file | 3 KB | 10/28/2010 07:18 PM |
| ☐ | [PDF] | Classifications Resource Guide.pdf | 494 KB | 10/05/2010 07:21 PM |
| ☐ | W | W/RxxxxTC-300-SUBTAG CAT-2 parm test | 18 KB | 10/05/2010 07:02 PM |
| ☐ | W | WRTC-300-SUBTAG CAT-2 using parms | 18 KB | 10/04/2011 10:10 PM |

FIG. 6

```
function Object RKTEngineExecute(Object stp)
    /*FUNCTIONHEADER ---------- */
    `%L.scriptHeader()`
    //Socket ctxOut = request.ctxOut
    // Used by action tags to ensure some things run only once.
    stp.fOutputiteration = false
    String s
    Record rec
    `%L.processReportView( .getHeaderSection(), 20)`     ← 701
    //Write the SOURCEROWNUM
    Integer srn=0
    for rec in rdp.fRowData
            rec._SOURCEROWNUM = (srn=srn+1)
    end
    `%L.processReportView( .getHeaderSection(), 1)`
    //Header section 5th iteration for variables that may be used in sort
    `%L.processReportView( .getHeaderSection(), 5)`
    /*--SORT---------------*/
    rdp.ResetSortColumns()
    `%L.processReportView( .getRowSection(), 1`
    rdp.ApplySort(stp)
    /*--FILTERING & VARIABLES--------*/
    //for variable operations in the header
    Integer origRowNumber = 0
    Integer actualRowCount = 0
    Integer filteredRowCount = 0
    list actualRows = {}
    rdp.fTotalRows = length( rdp.rowdata() )
    stp.fRowNum = 0
    for rec in rdp.rowdata()
            stp.fRowNum = stp.fRowNum + 1
            rec._ORIGROWNUM = (origRowNumber=origRowNumber+1)
            // Iteration 2 handles INCLUDEDISTINCT and EXITIF
            `%L.processReportView( .getRowSection(), 2)`     ← 711
            // Iteration 3 handles INCLUDEIF
            `%L.processReportView( .getRowSection(), 3)`
            filteredRowCount = filteredRowCount + 1
            // Iteration 4 handles INCLUDERANGE
            `%L.processReportView( .getRowSection(), 4)`     ← 713
            //rec._ROWNUM = (actualRowCount=actualRowCount+1)
            actualRows = {@actualRows, rec}
            // required in INCLUDERANGE
            actualRowCount = actualRowCount + 1
            // Iteration 5 handles VARIABLES, ACTION TAGS
            `%L.processReportView( .getRowSection(), 5)`
```

```
        end
        rdp.fRowData = actualRows
        rdp.fFilteredRows = filteredRowCount
        rdp.fActualRows = actualRowCount
        `%L.processReportView( .getFooterSection(), 5)`
        stp.FinalizeVars ()
        /*-- Output Iteration ---------- */
        stp.fOutputIteration = true
        String headerSection, footerSection
        List rowSection = {}
        rec = RecArray.CreateRecord()
        s=""
        stp.fRowNum = -1
        `%L.processReportView( .getHeaderSection(), 6)`
        // INSERTJSARRAY - 7
        `%L.processReportView( .getRowSection(), 7)` // LL_WEBREPORT_INSERTJSARRAY
        headerSection = s
        /*-- Output: Row Section -- */
        stp.fRowNum = 0
        fieldCount = rdp.fFieldCount
        for rec in rdp.rowdata()
                //stp.fRowNum = rec._ROWNUM
                stp.fRowNum = stp.fRowNum + 1
                s=""
                `% L.processReportView( .getRowSection(), 6)`
                rowSection = (@rowSection, s)
        end
        ;// $RKTEngine.Timer.Stop('rowsection')
        stp.fRowNum = -1
        /*Output: Footer Section -- */
        rec = RecArray.CreateRecord()
        s=""
        `%L.processReportView( .getFooterSection(), 6)`
/********    **/
        If stp.fShowErrors
                s+= rdp.dumplog()
        end
        footerSection = s
        // compress and forceutf8
        `%L.processReportView ( .getHeaderSection(), 30)`
        /* -- Prepare Output-- */
        rdp.fHeaderSection = headerSection
        rdp.fRowsSection"= rowSection
        rdp.fFooterSection = footerSection
        return rdp
        end
```

FIG. 7B

SYSTEMS AND METHODS OF A SCRIPT GENERATION ENGINE

CROSS-REFERENCE TO RELATED APPLICATIONS

This application is a continuation of, and claims a benefit of priority under 35 U.S.C. § 120 from, U.S. patent application Ser. No. 16/530,624 filed Aug. 2, 2019, issued as U.S. Pat. No. 11,227,097, entitled "SYSTEMS AND METHODS OF A SCRIPT GENERATION ENGINE," which is a continuation of, and claims a benefit of priority under 35 U.S.C. § 120 from, U.S. patent application Ser. No. 13/917,767 filed Jun. 14, 2013, issued as U.S. Pat. No. 10,417,314, entitled "SYSTEMS AND METHODS OF A SCRIPT GENERATION ENGINE," which claims a benefit of priority under 35 U.S.C. § 119(e) from U.S. Provisional Application No. 61/659,696, filed Jun. 14, 2012, entitled "SYSTEMS AND METHODS OF A SCRIPT GENERATION ENGINE (SSGE)," both of which are all fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to document processing. More particularly, embodiments disclosed herein relate to systems, methods, and computer program products for efficient script code generation useful for high performance real-time document processing.

BACKGROUND

Traditionally, a web-enabled document such as a Hypertext Markup Language (HTML) document may be interpreted at run-time by a client-side application such as a browser executing on a client machine. Scripts or pieces of pre-built code may accompany such a document and appropriately invoke and/or call certain functions and/or data elements on a server-side platform such as a content server platform. Examples of content server platforms can be found in U.S. Patent Application Publication No. 2011/0238651, entitled "METHOD, SYSTEM, APPARATUS AND CONTENT MODEL FOR THE CREATION, MANAGEMENT, STORAGE, AND PRESENTATION OF DYNAMIC OBJECTS," and U.S. Patent Application Publication No. 2011/0246444, entitled "METHOD AND SYSTEM FOR MANAGING ENTERPRISE CONTENT," both of which are expressly incorporated by reference in their entirety herein.

In some cases, the functions in the scripts or pieces of pre-built code associated with a document must be called in a particular order to achieve a task and/or present the contents of the document to an end user at the client machine. This traditional document processing method was not efficient, not optimized, and not always operative with dependencies in the source code syntax of the document.

Another approach taken by some document processing systems relies essentially on a search-and-replace method to search a document and replace tag syntax with a corresponding data value. This approach has at least the following problems:

Inefficient—a verbose tag syntax is looked up and interpreted at run time.

Inflexible—in order to use a given tag as input to another tag (interdependencies in the syntax), a business user needs to know the order of the search and replace algorithm and various combinations didn't work or needed a complicated kludge to achieve.

Not easily extensible—any new tags need to be edited into existing code and could require significant re-work in some cases.

The disclosed novel systems and methods describe a new approach that includes a novel architecture and algorithms to solve one or more of the drawbacks of prior art systems.

SUMMARY OF THE DISCLOSURE

The disclosed systems and methods may create script code that can be run multiple times. The systems and methods may operate within a platform such as a content management system. The platform may include at least one server machine running a Server Script Generation Engine (SSGE) implementing an architecture and algorithms/code configured for processing a template and converting tags and sub-tags contained in the template into script code.

Within this disclosure, "template" may refer to source content that is used to specify an input to a process by the SSGE (also referred to as an engine process). A template may be created, generated, or otherwise built by a developer or business user using a graphical user interface or other interface. A template may be used in generating a dynamic document or an application (e.g., a software module implementing a report function) with a certain look and feel. A template may include a combination of content and tags/sub-tags that may dynamically add data or change the output in some way. An engine process disclosed herein may process an inputted template and generate corresponding script code.

Within this disclosure, "tags" may refer to special syntax that specifies different types of data that are normally substituted for the tag in any content. "Sub-tags" may refer to unique functions that may be used to modify the output from tags. One or more sub-tags can be included with/within any tag. From another perspective, a tag may be linked, chained, or otherwise associated with one or more sub-tags.

The script code corresponding to the tags/sub-tags may be in a language that is native to the platform. The script code can interface with the native platform's features and a database layer and can perform all of the output functions expected by the developer or business user to produce an output as specified by the developer or business user. The script code may be compiled and optimized in advance of run-time. A compiled script object containing platform-specific script code may be persisted in a memory structure and run multiple times without having to process the template again. For example, the compiled script object may be run in response to a request to generate a dynamic document or execute an application, producing an output as specified by the template without having to process the template in real-time. Such a request may be from a client device associated with an end user.

Moreover, innovation algorithms and techniques may be used to parse the tags and sub-tags contained in a template such that dependencies between tags and sub-tags are managed in generating the corresponding script code. Such dependency based processing by the SSGE is explained herein. Furthermore, a tag object library may be used by the SSGE in processing the tags and sub-tags contained in a template, as explained herein. Objects in the tag object library may include features/attributes such as the novel fIteration attribute, GetScriptO function, and GetScriptSubClassO function.

Embodiments of a new SSGE disclosed herein implements a new architecture and algorithm which generally takes advantage of one or more of the following:

A template built by a developer or business user may contain tags and sub-tags. Each tag may have a certain behavior and properties. Tags are stored in an object based structure (e.g., a tag object library) that is extendable and allows each tag's behavior and properties to be specified in a common structure.

Each template is parsed when first submitted (e.g., instead of at run time). The SSGE may cumulatively add a script for each tag in conjunction with code and data (from a data layer of the underlying platform) to produce an actual output when requested.

The script code being generated by the SSGE is arranged and ordered so any and all dependencies between the tags and the sub-tags in the template can be automatically and correctly resolved.

The newly built script code is compiled from a human-readable programming language (e.g., a scripting language) to a machine-readable programming language (e.g., a compiled language) and then persisted, for instance, by storing the compiled script code in a memory structure using a unique key that relates to the original template.

Information that cannot be built into the script code may be handled using specially designed data objects, as explained herein.

As a result, at run time, no or minimal parsing and tag replacement is required. The compiled executable is simply run, eliminating the need for and thus the drawbacks of the aforementioned search-and-replace method commonly used in prior art systems.

A system implementing a SSGE disclosed herein may further include a user interface. The user interface may allow business users to create applications without the need for an experienced, platform-knowledgeable programmer. Overtime, as such a software/hardware system/platform can be improved and honed and all templates can benefit from these optimizations. The system scalable and is adaptive to improvements in conjunction with updates to the native platform software without requiring onerous application re-writes.

In accordance with various aspects of the disclosure, a first embodiment includes a method to process a template and convert it into platform-specific script code for later retrieval/execution, the method comprising receiving a template and transmitting the template to an engine (e.g., an engine associated with the WebReports module in an Open Text Content Server (OTCS) platform) for processing. The engine may trigger a call to an object (e.g., a "Toscana" object described herein below) to start an algorithm to process the template. The engine may access a tag object library. The tag object library may comprise a tag object library and/or a sub-tag object library. Alternatively, the tag and sub-tag libraries may be combined in a single object library.

The engine may load a file (e.g., a framework file or other file) which may already contain all the static script syntax of the template, as described herein. The engine may then parse the file, including all text in the file, until a special symbol is found that indicates a defined location where tags could be inserted. For each such defined location found in the file, the engine may parse the template, specifying one of a select number of "iterations".

The template may be parsed as follows. The engine may "tokenize" the source and break the source down into several lines that are either pure strings (content) or lines of tags and sub-tags. The tokens may be processed in a repeat loop and handled, in one example, as follows: (However, one skilled in the art after review of the present application will appreciate that other techniques may be used to in lieu, or in addition to, tokens to parse/process the source file.)

Any pure content in tokens is converted into a string definition that will add the content to a string variable when the script is executed.

Any tags found are looked up in a tag subsystem. If the fIterations feature (explained below) includes a number corresponding to the current iteration, then a function of the tag called getScript is invoked which, in turn, invokes a function called getScriptSubclass which returns a chunk of script associated with that tag.

All the script code retrieved from this tokenizing may be returned/inserted into the framework file in particular locations.

One of the results of this algorithm is the insertion at the various points where tags can be inserted and the use of a system of iteration numbers (e.g., fIteration of the tag object's attributes) that allows each tag/sub-tag to identify whether it will respond to the parser or not. In addition, the GetScriptO and GetScriptSubClassO functions are executed to retrieve the script code corresponding to parsed values. These functions are further explained below.

The engine compiles the processed framework file and stores it as a feature in a compiled script object (created using a predefined object, as discussed herein). The engine (or other component of the system) may optionally create a unique key and add this object to the compiled script subsystem (using the key). Additionally, the system may serialize the object and store it in the file system also using the unique key. As such, the object may later be retrieved from various locations using the key. In some embodiments, the object may be pre-cached in memory for faster access on subsequent requests.

In accordance with various aspects of the disclosure, a second embodiment includes a method to process a request to display the output of a predetermined template in a content server platform, the method comprising receiving a request for a template (or other file) (e.g., from a WebReports module in an OTCS platform) and finding a correct executable compiled script code corresponding to the template using a unique key, as described herein. If the compiled script code does not exist, then the method triggers a call to an engine to generate it. If the compiled script code does exist, then the method accesses an object (e.g., "Toscana" object) to retrieve the pre-compiled code (e.g., bytecode). The method then transmits the pre-compiled script code to the native content management platform (e.g., OTCS) for execution and output generation (e.g., displaying a report for a user to view).

In accordance with various aspects of the disclosure, a third embodiment includes a system comprising a processor (e.g., processor 103 in FIG. 1A) and a computer memory (e.g., memory 115 in FIG. 1A) storing modules of a content server platform (e.g., OTCS). The modules may include a server script generation engine (SSGE). The SSGE may have access to a tag/sub-tag object library. The tag/sub-tag object library may store objects representing tags and sub-tags. Such objects may use inheritance and other object-oriented programming features to interact with and build off existing objects. Each tag/sub-tag may contain pieces of code that can be optimized for maximum efficiency and compatibility with a target platform.

The SSGE may include a component processor (e.g., WebReports processor, the WebReports being a component of the content server platform). The component processor may receive requests from end users (e.g., a request for a web-based report on certain data on the content server platform) and output the finished products to the users (e.g., presenting the web-based report on an end user's device).

Additionally, the SSGE may include a script builder, a script building object (e.g., Toscana object), a tag/sub-tag processor, a row processor, and a script storage. These are further described below.

In accordance with various aspects of the disclosure, a fourth embodiment includes at least one non-transitory computer-readable medium storing computer-executable instructions, which when executed by a processor, cause an apparatus to perform steps similar to the steps of the other embodiments disclosed herein, including the first through third embodiments above.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 1A illustrates an example block diagram of a generic computing device in an example computing environment that may be used according to one or more illustrative embodiments of the disclosure.

FIG. 4 depicts a diagrammatic representation of a portion of an example template according to one embodiment disclosed herein.

FIG. 5 depicts a diagrammatic representation of a portion of an example native platform script generated by a script generation engine according to one embodiment disclosed herein.

FIG. 6 depicts a diagrammatic representation of a portion of a result of executing an example native platform script generated by a script generation engine according to one embodiment disclosed herein.

FIGS. 7A-7B depict a diagrammatic representation of an example framework file used by a script generation engine according to one embodiment disclosed herein.

DETAILED DESCRIPTION

Figure 1B:
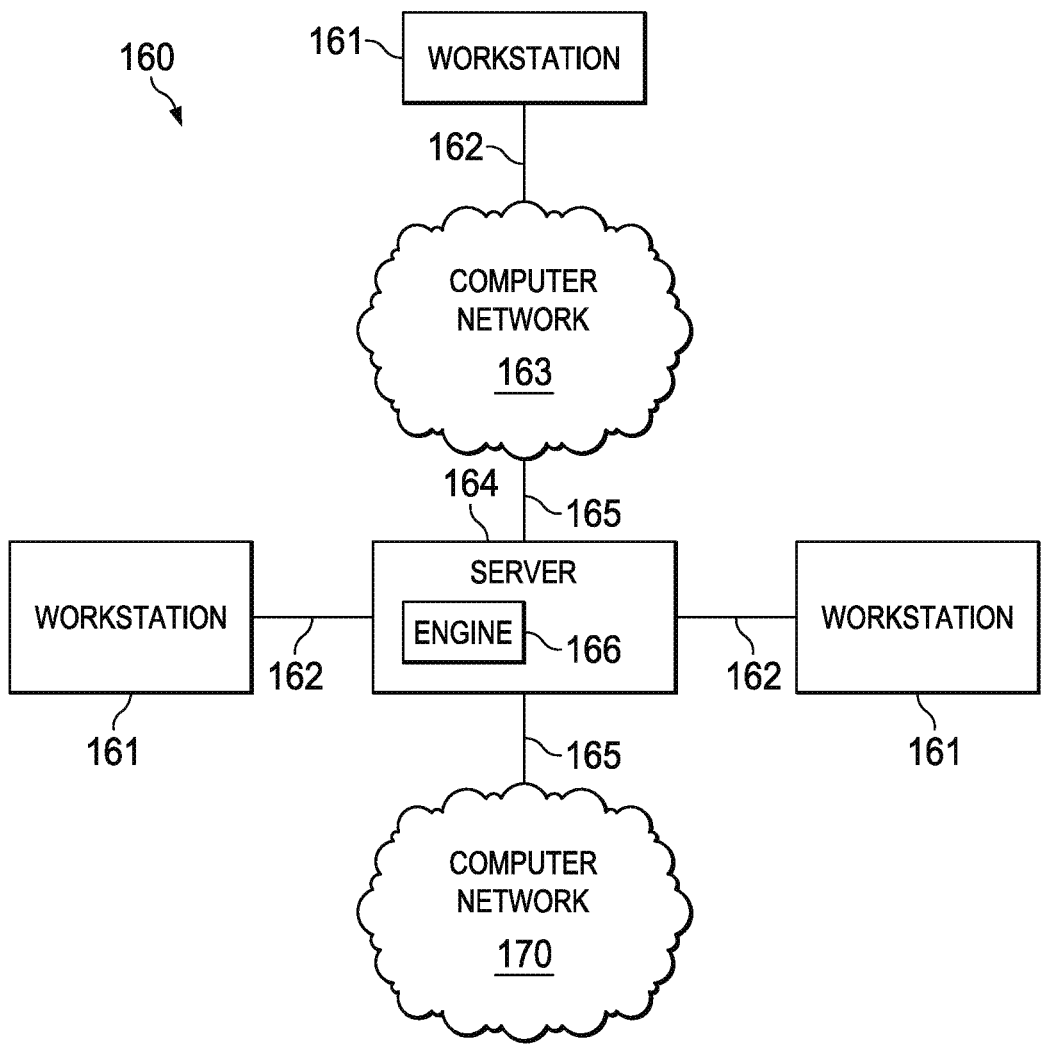
FIG. 1B illustrates another example operating environment in which various aspects of the disclosure may be implemented.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In describing embodiments of the systems and methods disclosed herein, particular terminology has been used throughout the disclosure. Some examples of how these terms may be used are listed below, but these examples should not be construed to be a narrow definition of the terms. Rather, the terms must be given their broadest reasonable meaning in view of the entirety disclosed herein, including any materials incorporated by reference herein.

Modules. Computer-executable instructions may be delivered in logical units called modules. Each module may include a collection (e.g., compressed collection) of files, including but not limited to files with .oll extensions (e.g., ospaces), graphics files, HTML source files, and other files. Some or all of the files may be used during the modules operation/execution. In some examples, modules may be installed/uninstalled through built-in administrative options in a platform (e.g., the Open Text Content Server (OTCS) platform, or other platforms).

Oscript. Oscript is the native language used for development on the Open Text Content Server (OTCS) platform. It is an object-based language that is compiled into bytecode, which is referred to as OCode. One of ordinary skill in the art will appreciate that embodiments implemented on other platforms may include the native language including terms used for development on such platforms.

Ospace. An ospace is the largest grouping of native Oscript software. It is made up of several objects each of which can have multiple features. There can be one or more ospaces in a module.

Objects. An ospace is made up of one or more logical units called objects that support object inheritance. Each object can include one or more "features" and each object can be initialized during a restart. Objects can be permanent or temporary. Objects created during development are permanent but during code execution temporary objects are created and used for temporary actions.

Feature. Feature is a generic term for any items stored by an object. Features can include, but are not limited to, scripts, variables (e.g., Booleans, strings, lists, arrays, etc.), or other items.

Script. A script may be an editable text file that can include one or more functions (e.g., Oscript functions). A script may be referenced (using its name) in order to execute that script.

Function. A function is a logical chunk of Oscript code akin to functions in other high level programming languages.

Subsystem. A subsystem is a data structure created in a server (e.g., OTCS) kernel that may be designed to store and retrieve temporary objects. An Ospace can create its own subsystem and use the built-in kernel software to manage it.

WebLingo. WebLingo is a type of file that commonly contains HTML content and may be used in a server (e.g., OTCS) to design output pages for users. It allows some Oscript to be blended into the HTML content in order to make HTML pages dynamic.

An illustrative operating environment will now be described with reference to FIG. 1A and FIG. 1B.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115. I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTIP, HTIPS, and the like is presumed. Generic computing device 101 and/or terminals 141 or 151 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants. System 160 may include additional servers not illustrated in FIG. 1B. One of ordinary skill in the art will appreciate that server 164 may represent one or more server machines.

According to one or more aspects, system 160 may be associated with a content management system, such as Open Text Content Server (OTCS). One or more workstations 161 may be located within a business unit of a company for business users to access a graphical user interface into the OTCS. Such workstations may be used, for example, by business users and/or users of OTCS in configuring and retrieving content via network 163. Additionally or alternatively, one or more workstations 161 may be located at a user location (e.g., a customer's home or office). Such workstations also may be used, for example, by users in conducting actions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, etc.

An example framework architecture including a script generation engine operating in the illustrative operating environment described above will now be described with reference to FIG. 2.

In some embodiments, a script generation engine running on a server machine (e.g., engine 166 on server 164) can generate efficient scripted solutions from a user created tag and template based specification. The scripted solutions can interface with a platform's native features and database layer. More specifically, a user can specify a template/tag based interface using any suitable tool. Embodiments disclosed herein provide the framework architecture, components and algorithms to convert this user-specified interface (or any similar type of interface) into a platform ready, compiled and optimized executable file that can be run multiple times.

At a high level, most web-based content management systems require components that provide the means to output or display any system or database information in a human readable form. Such components also usually present options or commands to allow two-way interactions with the underlying platform. Typically, these components have to work within the rules and security constraints of the native platform. These components can collectively be used to create simple reports or complex applications that operate seamlessly within the fabric of a given platform.

There are a variety of ways that content management systems approach the building of these components. However, in many cases, manual programming or scripting is involved to build even simple reporting applications. The nature of having these applications within a system like this also requires close coupling between the various objects and features of the system in question. This typically means that any applications built for the system with standard programming paradigms, may need significant re-work to survive software upgrades of the underlying platform robustly.

Embodiments disclosed herein provide a methodology and framework architecture to allow users, including business developers with non-proprietary skills and limited specific system knowledge, to specify application components (also referred to as software modules) primarily based on the look and feel or proposed output of the application components. Such a specification may be referred to as a template.

Figure 2:
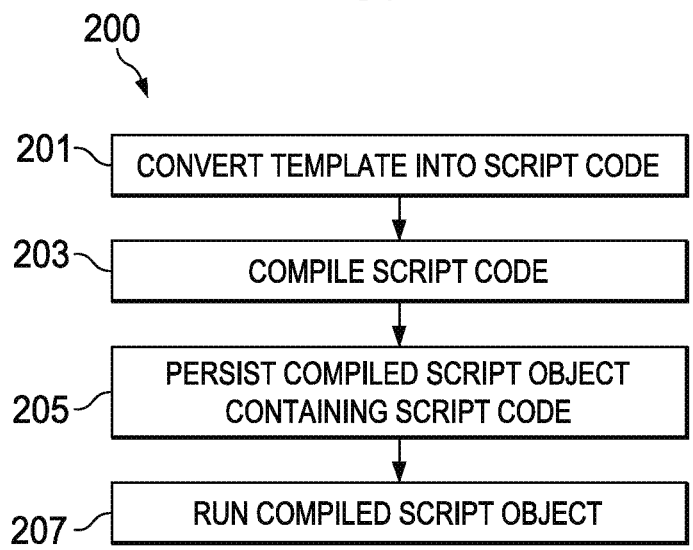
FIG. 2 depicts an example of a high level operation flow of a script generation engine according to one embodiment disclosed herein.

Referring to FIG. 2, a high level operation flow 200 of a script generation engine running on a server machine (e.g., engine 166 on server 164) may include converting a template into script code (step 201). The template may be an output specification for a software module or application component. The script code may be specific or in a language native to a platform or target system (e.g., OTCS). The script code may be compiled into an executable (e.g., a compiled script object) (step 203). The executable containing the platform-specific script code may be persisted in a memory structure (step 205). The executable can be run directly and natively on the platform or target system (step 207). Specifically, any time a software module or application component is requested to be executed, instead of having to process an output specification template for the software module or application component in real time, a corresponding compiled script object can simply run.

The framework architecture for managing this behavior may include the following components:

A tag object library. This library allows the encapsulation of any supported user "tags" into objects.

A script generation engine. This includes all of the structures, algorithms and utilities to process a template and handle all of the specified tags as specified in the tag objects. This engine must also handle the generation of all specified text in the appropriate position in the script output.

An execution environment. This environment contains objects that support access to any runtime data (including database queries) required from the host platform. This environment isolates many of the platform specific methods and data types.

A script storage and execution system. As scripts are built and compiled by the script generation engine, this script storage and execution system provides a mechanism to store and cache them so that the build is required only once. The script storage and execution system also manages re-building when changes occur.

Tag interaction methodology. This includes a defined architecture for allowing tags/sub-tags to pass information to each other and to manage dependencies between tags if necessary.

An example of the framework architecture described above including a script generation engine implemented on an OTCS platform will now be descried with reference to FIGS. 3-8 and referred to as a server script generation engine (SSGE) framework.

In this example, the OTCS platform is written in a language called Oscript. In addition to the basic "Kernel" of software used as an operating system, the OTCS platform includes Oscript software in units called modules. The OTCS platform is extensive and adaptive in that new modules can be developed and installed on an OTCS system using an administrative feature called Install Modules.

The exemplary OTCS platform may include many components, some of which may be contained in a software module called "WebReports." Example components of the WebReports module may include:

HTTP request management. The WebReports module provides an infrastructure to allow user access to any executable code generated by a script generation engine running on the OTCS platform.

Component management. The WebReports module provides functionality to allow the creation, editing, and retrieval of any components (e.g., WebReports objects as they appear in the context of an OTCS platform) created by business users.

Tag/Sub-tag language. The WebReports module provides a unique syntax and a library of defined tags to allow business users to specify where in their content they want defined pieces of platform data (or database data) to be inserted. In addition to a set of tags, this library may include a set of functions called "sub-tags" that provide a means of modifying and manipulating the data returned by tags. The SSGE framework has been tailored to recognize the tags and sub-tags implemented by WebReports.

Data Sources. The WebReports module provides a means of selecting from different data sources (such as database queries) to provide data that can be used by the SSGE.

Destinations. The WebReports module provides a means of selecting different destinations where the output from the SSGE can be sent or delivered. In an example scenario, the output is delivered to a browser client in response to a user request. However, this capability also supports output being stored in defined locations, placed in structured data locations, and/or emailed to defined users.

Template Editor. The WebReports module provides a user friendly editor software tool that allows business users to create templates that specify content and tags/sub-tags.

Constants/Parameters/Variables. The WebReports module provides an interface to define constant data values, user request parameters, and variables. These items are viewed or accessed by tags.

Figure 3:
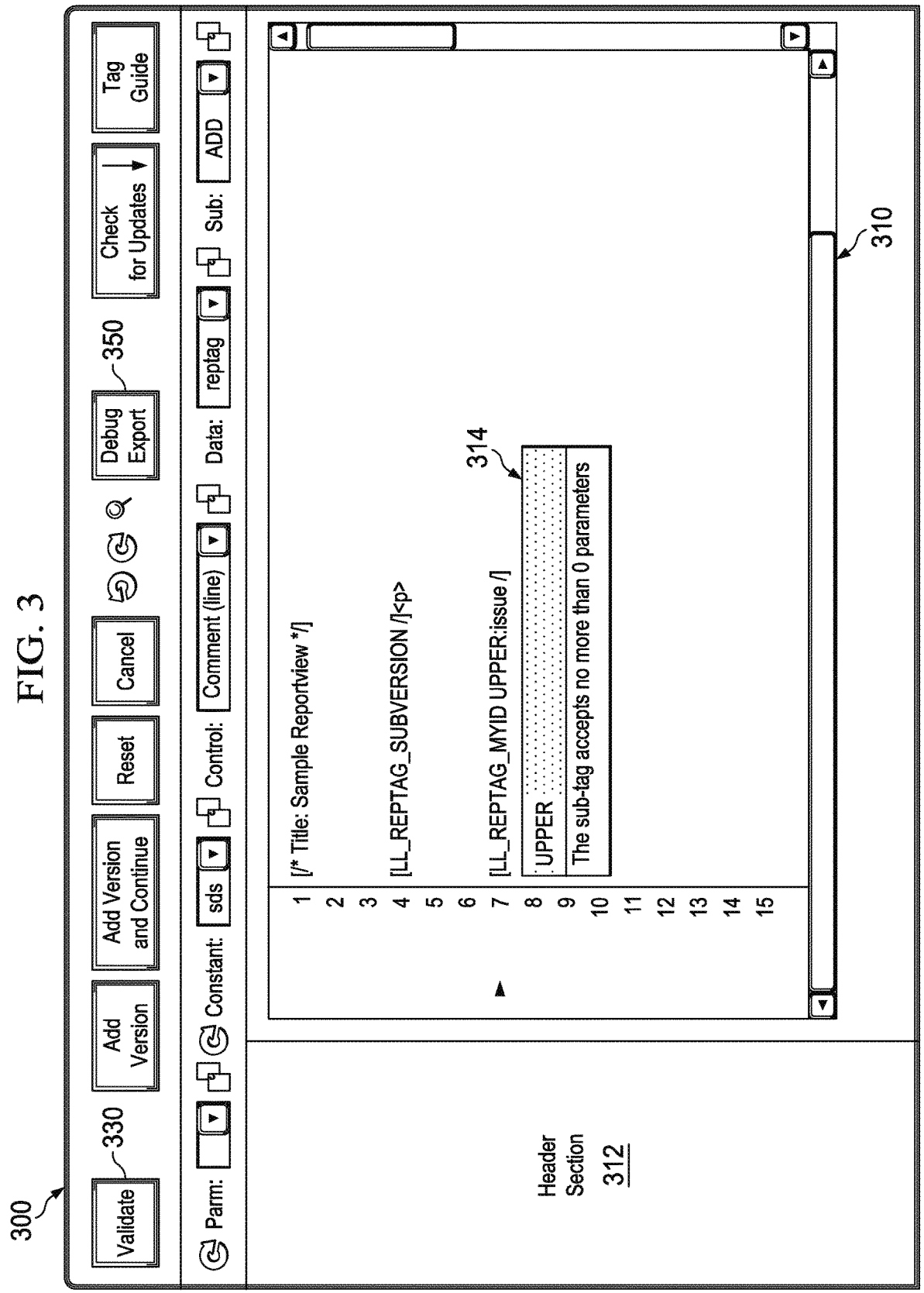
FIG. 3 depicts a diagrammatic representation of a portion of a user interface of an example template editing tool according to one embodiment disclosed herein.

FIG. 3 depicts a diagrammatic representation of a portion of a user interface of an example business user friendly template editing tool. One of ordinary skill in the art will appreciate that other implementations of a template editing tool may also be possible. In FIG. 3, header section 312 of template 310 is shown via online reportview editor 300 running on a client device (e.g., workstation 161 within a business unit of a company for business users to access the OTCS as described above with reference to FIG. 1B). A developer or business user can use online reportview editor 300 to create templates that specify content and tags/sub-tags.

In this case, template 310 contains the output specification of a report view. Upon selection of a validation button (e.g., Validate 330), template 310 is communicated to a SSGE running on a server machine (e.g., engine 166 running on server 164 as shown in FIG. 1B) at the backend and the SSGE operates to process and compile template 310 as described above with reference to FIG. 2. If there is an issue with the report view that the user is trying to build, the SSGE communicates an error message to online reportview editor 300, with a reason why the report view did not build correctly. This is in addition to online reportview editor 300 showing line numbers, along with a pointer to the line where the error is found. Additional detail about the error may be shown. For example, in FIG. 3, an error is found at line 7 and message 314 may pop up when line 7 is rolled-over with a pointing device, explaining why the report view did not build correctly. Additionally, an export of the report view can be created by selecting Debug Export 350. The export may contain additional issue detail. If there are no issues with the report view, a corresponding script is built by the SSGE. A report thus generated may contain information about the original report view along with the script that was built during processing by the SSGE.

FIG. 4 depicts a diagrammatic representation of a portion of an example template according to one embodiment disclosed herein. In this example, template 400 has header section 410, row section 420, and a footer section (not shown). One of ordinary skill in the art will appreciate that other implementations of a template layout may also be possible. Further, template 400 is shown to include various tags (e.g., tag 430) and sub-tags (e.g., sub-tag 440). Each tag can have one or more sub-tags arranged or otherwise linked in a chain. This is further explained below.

FIG. 5 depicts a diagrammatic representation of a portion of an example native platform script generated by a script generation engine according to one embodiment disclosed herein. As further described below, a template built by a user is processed and converted in to script code by the SSGE. As shown in FIG. 5, in some embodiments, the script code is compiled by the SSGE into a language called Oscript that is native to the OTCS platform. The compiled script code is stored in an appropriate memory structure so that any time a request to run this "report" is executed, the same compiled code is run. An example output of an executed script is shown in FIG. 6.

FIG. 6 depicts a diagrammatic representation of a portion of a result of executing an example native platform script generated by a script generation engine according to one embodiment disclosed herein.

From a business user's point of view, they design an application (a report in this case) using a combination of HTML code and tags/sub-tags and then after submitting this application (by adding the content to the platform), end users are able to execute this application through a defined URL. End users see the output view 600 as shown in FIG. 6, as if they were running native code on the platform.

Various components implemented by the SSGE framework will now be described in some detail below.

A tag object library. This is an object based library that includes all of the tags that are defined for the platform. As described above, this library allows the encapsulation of any supported user "tags" into objects. Depending on the programming language and development platform, the various tags can be categorized into different types and organized accordingly so that tags that have common fields and settings can inherit from each other.

Each tag has certain specific properties that need to be specified by the developer and stored to allow the engine to perform its function. The important (core) tag properties are described below. Each tag in the SSGE framework should consider all of these properties to see if they apply to the functionality provided by that tag. In the OTCS example, based on the WebReports syntax, tags and sub-tags are handled differently in the SSGE framework. In addition, there are two distinct types of tags in the SSGE framework: content control tags and data tags. These tag distinctions and any other common groupings are managed through different sub-trees in the hierarchy (see below). Common tag properties in the SSGE framework include:

fControlTagName (String)—a unique identifying name for the tag.

fEnabled (Boolean)—allows each tag to be turned on or off by a developer or business user.

GetPattern (Script)—returns a search pattern that aids in finding each tag in the source.

GetScript (Script)—a standard chunk of code that primarily calls getScriptSubclass and then takes the returned script and calls_subTagChainScript to process any related subtags (see below).

GetScriptSubclass (Script)—returns a chunk of native script that will be inserted in the output Oscript that will be built. This feature returns a string that contains valid Oscript syntax that ultimately gets added to an overall output string that is compiled once complete.

subTagChainScript (Script)—creates a framework around the tag code to allow any associated sub-tags to be chained together in an appropriate syntax to support tag interaction (see A tag interaction methodology below).

Execute (Script)—This feature is used to specify any code specific to a given tag that needs to be invoked at run time. Often, it is sufficient to provide a series of script statements in the GetScript feature; however, for more complex tags an execute script can be created. The syntax to invoke this script is added by the GetScript feature. For example, the GetScript feature could return something like this:

Str.Format("$RKTEngine.TagSubsystem.GetItem('%1').Execute(stp, %2, %3, %4)", .OSName, arrName, scrTag, multiVal)

Note that the Execute Script is ultimately added to the run time, with a tag processor object (explained below) using the tag name as the script name. This aids in the speed of lookup and resolution at run time.

Documentation (String)—specifies text to be used for generating a help file. Each tag includes a description (usually in HTML coding) that is ultimately added into an overall help guide.

ValidateTag (Script)—Any unique code required to validate a new tag is implemented with this feature.

fIterations (List/Array)—This feature allows a given tag to be inserted in different areas of the output script. When the script is being built (see below), the script builder parses the template multiple times (iterations). Each tag can be set to respond to different iterations, i.e. its GetSCriptSubclass feature is only invoked if the current iteration number of the script builder is found in the fIterations list that is set for the tag.

fSectionHeader, fSectionRow, fSectionFooter (Boolean)—indicates which parts of the template the tag is allowed in (used by the ValidateTag script).

fShowInTagGuide (Boolean)—Used to determine if a given tag will be visible in the user documentation (some tags can be undocumented).

Tags are initially created in a hierarchy of objects, for example, a hierarchy of Ospace objects. Each object is designed so that a constructor (_nit script is used for this on an OTCS platform) will add the object to a subsystem. A subsystem in the OTCS parlance is a predefined data structure that allows easy creation, retrieval and deletion of objects. The tags objects are primarily retrieved during the build of a script to allow the script builder to find the tag syntax in the source and then to include the appropriate Oscript in the output script. In addition to this, however, some tags have Execute scripts that represent code that must be used during script execution so the speedy retrieval of tags is important.

A sub-tag object library. A sub-tag is a function or snippet of code that is designed to operate on data returned by the tags. In WebReports, this concept is referred to as sub-tags as these "functions" are applied within tags. These sub-tags can be chained together to allow the output of each sub-tag to be used by the next sub-tag in the chain etc. All tags and sub-tags share a common "All Tag" parent, but are each stored in a separate hierarchy as they have a slightly different structure and application. Each sub-tag object may have the following properties:

fEnabled (Boolean)—allows a developer or business user to enable or disable a sub-tag.

fMinParms (Integer)—used to specify the minimum number of parameters allowed for a sub-tag (used by ValidateTag).

fMaxParms (Integer)—used to specify the maximum number of parameters allowed for a sub-tag (used by ValidateTag).

Execute (Script)—All sub-tags require run-time code and this code is stored in the execute script. As all sub-tags can be chained together and also respect different dependencies, each execute script has specific criteria for inputs and outputs as follows:

Any parameters (arguments) provided to the sub-tag by the user will be passed to the sub-tag script as an Oscript list (e.g., (List args={ })).

Any references to the data being passed into the sub-tag can be referenced via .fData. Several scripts have been provided for the run time environment to allow the .fData to be converted to any data type from whatever data type the previous sub-tag created.

Any output from the sub-tag is stored using .fData (e.g., .fData=result).

The execute script is used differently than for tags. The sub-tag objects are not actually used at run-time. Rather, each execute script is converted into a script using the name of the sub-tag and which is stored in:

a sub-tag subsystem for easy retrieval during script build (this is created during initialization using the _init constructor.

a tag processor—an object that is available during script execution and that allows each sub-tag to be accessed using a dot (.) reference (e.g., .ASSOC( )).

GetScript (Script)—All sub-tags use the same getScript which is built into the hierarchy. This getScript generates the necessary script code to invoke the sub-tag's execute statement. Specifically, it creates a line of code like this: .<sub-tagname>(<arguments>). This code becomes valid when added in a chain of sub-tags by the script builder.

ValidateTag (Script)—Most sub-tags use a common version of this script that primarily checks to ensure that the number of arguments passed to the sub-tag are more than the fMinParms and less than the fMaxParms. This script is used during the building of the script so no run time validation is covered in this script—only in the execute script.

Documentation (String)—specifies text to be used for generating a help file. Each sub-tag includes a description (usually in HTML coding) that is ultimately added into an overall help guide.

fSectionHeader, fSectionRow, fSectionFooter (Boolean)—indicates which parts of the template the sub-tag is allowed in (used by the ValidateTag script).

fShowInTagGuide (Boolean)—used to determine if a given sub-tag will be visible in the user documentation (some sub-tags can be undocumented).

A script generation engine. This is the scripter builder and compilation component of the SSGE framework and includes the code and algorithm required to process a user template and convert it into a syntactically valid script that performs all of the output functions expected by the user. This component is partially responsible for the relative efficiency and platform compatibility of any generated script. In addition to this component, each tag or sub-tag contains pieces of code that also should be optimized for maximum efficiency and compatibility with the target platform.

An example script building algorithm will now be described with reference to FIGS. 7A-7B, which depict a diagrammatic representation of an example framework file used by a script generation engine, and FIG. 8, which depicts a flow illustrating an example script generation process.

Specifically, FIGS. 7A-7B show framework file 700 containing static script syntax with various insertion points (e.g., insertion points 701, 711, 713). As illustrated in FIG. 7A, each of the insertion points is associated with a predetermined iteration number (e.g., insertion point 701 is associated with iteration number 20, insertion point 711 is associated with iteration number 2, and insertion point 713 is associated with iteration number 4). Such a framework file may be used when a request for a (yet to be built) compiled script is received.

Figure 8:
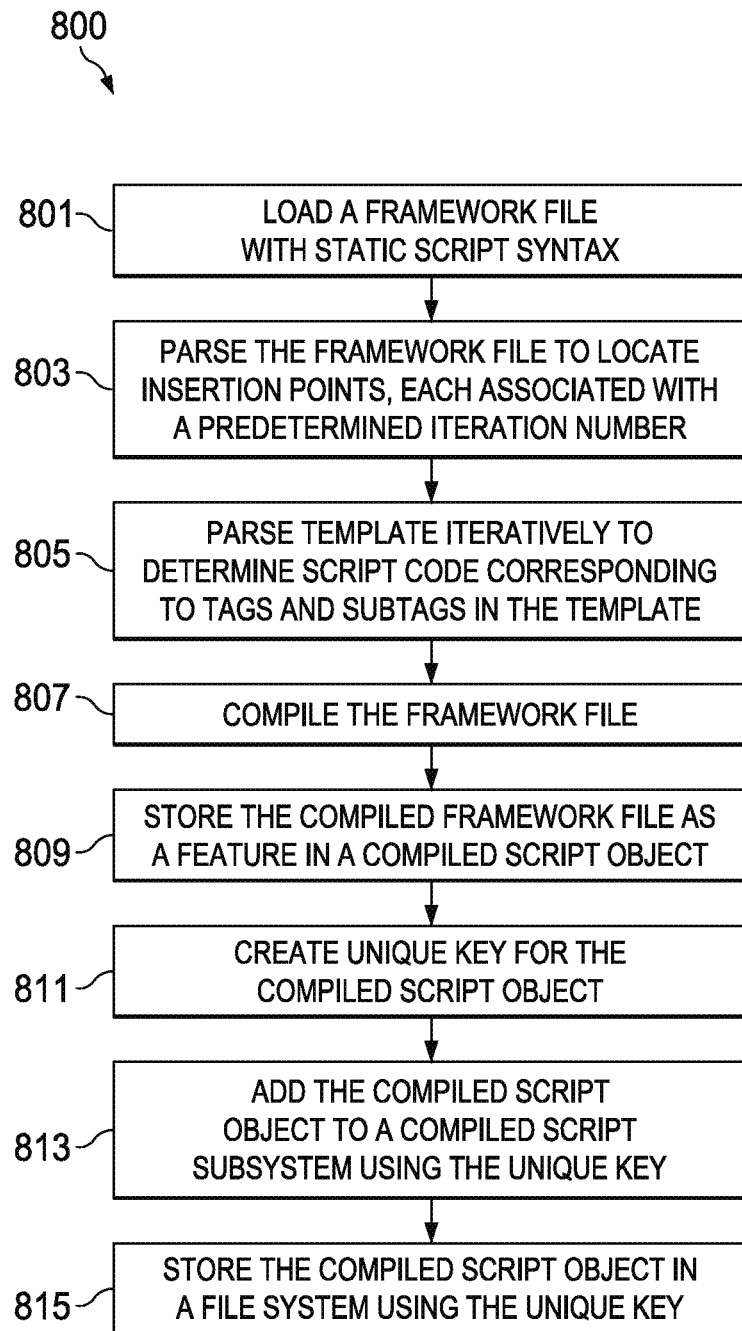
FIG. 8 depicts a flow illustrating an example script generation method according to one embodiment disclosed herein.

As a specific example in the OTCS platform, a request for a compiled script (from executing code in the WebReports module) can be done like this: $RKTEngine.CompiledScriptSubsystem.GetItem(.fPrgCtx, request.node, request.verNum, keyModifiers). The getItem function detects that the required script does not yet exist and must be built, triggering a call to: toscana.CompileReportWithCache (prgCtx). In this case, "Toscana" is the name of a script building object which is further described below. This call effectively starts the algorithm described below:

Referring to FIG. 8, process 800 may begin with loading a framework file (e.g., framework file 700) with all of the script syntax that is static (step 801).

A script generation engine executing process 800 may parse the framework file, including all text until a special symbol (e.g., "% L") is found that indicates a defined location that could have tags inserted (step 803). For each defined location (e.g., insertion point 701 shown in FIG. 7A), the engine may parse the template source (e.g., template 310 shown in FIG. 3, template 400 shown in FIG. 4, or the like), specifying one of a select number of "iterations" (e.g., insertion point 701 shown in FIG. 7A is associated with an iteration number 20). In one embodiment, the template may be parsed (step 805) as follows.

The source is parsed by "tokenizing" which breaks the source down into several lines that are either pure strings (content) or lines of tags and sub-tags.

The tokens are looped through and handled as follows:

Any pure content is converted into a string definition that will add the content to a string variable when the script is executed; and Any tags found are looked up in the tag subsystem. If the fIterations feature includes a number corresponding to the current iteration, then the tag's getScript function is invoked which will in turn invoke getScriptSubclass to return a chunk of script associated with that tag.

All the script from this tokenizing is returned into the framework file in the defined location.

The processed framework file is then compiled (step 807) and stored as a feature in a compiled script object (created using a predefined object discussed below) (step 809). A unique key may be created for the compiled script object (step 811) which can then be added to a compiled script subsystem (using the unique key) (step 813). Additionally, the compiled script object can be serialized and stored in a file system also using the unique key (step 815).

One aspect of the above described algorithm is the insertion of the various points where tags can be inserted and the use of a system of iteration numbers that allows each tag to identify whether it will respond to the parser or not. The output framework has been instrumented (hard coded) with a sufficient number of these points such that any given tag is able to manage its function correctly. As an example, if a given tag requires a variable be declared in the header of the script as well as some script in the row section, it might set the fIterations feature to 20 (Header) and 2 (one of the row section iterations). In this case, the getScript function could return different code depending on whether the iteration number was 2 or 20 (e.g., insertion point 701 shown in FIG. 7A is associated with an iteration number 20; whereas, insertion point 711 is associated with an iteration number 2). Iterations can also be used to force a certain ordering of tags in the output. For example, an INCLUDEDISTINCT tag may be required to be inserted prior to an INCLUDERANGE tag so that INCLUDEDISTINCT responds to an iteration of 2 and INCLUDERANGE responds to an iteration of 4. In the example framework file 700 shown in FIG. 7, these two insertion points correspond to reference numbers 711 and 713.

Accordingly, a target script is essentially built by a script generation engine from a user specified, customized, or otherwise configured template in conjunction with a built-in, predefined, platform-ready framework file. In the example OTCS platform, this framework file can be defined using an Oscript device called a "WebLingo". This is essentially a file that can be compiled dynamically from the OTCS platform. The script building portion of the script generation engine defines a basic starting framework that is then used to build the target, final script corresponding to the user's template.

The framework file provides all of the Oscript code that will always be present in a built script, as well as a number of "hooks" where the tailored code, specific to each new template, will be inserted. In the example framework file 700, these "hook points" look something like this: '%L.processReportView(.getHeaderSection( ), 20)'. This specific syntax (') works with the OTCS WebLingo format and the '%L . . . ' causes any Oscript functions in between these two symbols to execute and then return text to be added to the framework file.

The various pieces of code that are used to do the actual building within the SSGE framework are stored in an object called Toscana. This script building object is referenced when a new script is to be built and a temporary instance is created for each script being built. These temporary instances are stored in a subsystem (see above) with one temporary object for each script that exists on the system. These temporary objects are also stored in a file on the file system as the memory version is lost during a system restart. Once this object has been created in memory, retrieval of the executable code for each script is relatively fast. A script building object may include special functions for building a new script. In the context of the OTCS platform example, these may include the following:

ProcessReportView—This is the main script called from the example framework file 700 (e.g., insertion points 701, 711, 713, etc.) that does some text preparation and then invokes processString.

ProcessString—performs the example script building algorithm described above.

getHeaderSection—returns all of the source in the header section of a template source.

getRowSection—returns all of the source in the row section of a template source.

getFooterSection—returns all of the source in the footer section of a template source.

An execution environment. As described previously, this environment contains objects that support access to any runtime data (including database queries) required from a host platform when a built script is being run. These objects can be important to allow management of dynamic information such as stored variables etc., although they may vary from platform to platform. The following is a list of primary objects supporting the execution environment in the example SSGE framework on the OTCS platform.

WebReports Processor. This object is configured to manage dynamic information required by the WebReports module. This object includes items like:

Temporary memory areas for caching data as required

User defined variables

State settings

Information related to the source and destinations

Tag Processor. This object provides the execution context for any tags that have runtime code included. All of the sub-tag scripts are also stored in this object. The object is dynamically created and then passed to the executing script. This object can also be used for a variety of useful scripts and functions to provide in the runtime environment. For example, a script called GetParameter is used to extract parameters from the user request. This is used by one of the current tag types. Besides the various tag and sub-tag scripts that exist in this object, it also has:

fData (Dynamic)—data field used to store and pass data between different tags and subtags setData—sets the .fData feature getData—gets the .fData feature RowDataProcessor (Script)—instantiates a row processor object and returns it Row Processor. The main function of the row processor is to provide a connection to the row data that is provided from the WebReports module. This object is stored as a sub-feature of the tag processor that is passed to the executing script from the WebReports module. It provides several different functions that are used to retrieve or calculate various pieces of information relative to the data from the data source.

A script storage and execution system. As a script is built and compiled, a script storage and execution system can provide a mechanism to store and cache the script such that the script only needs to be built once and can be run multiple times whenever needed.

The main object involved in this process is the script building object (referred to as the Toscana object in the example OTCS platform) described earlier. This object is used as a parent to instantiate dynamic objects that exist for each and every compiled script. These dynamic compiled script objects are added to a subsystem (referred to as a compiled script subsystem) for easy retrieval (e.g., using a unique key). As this subsystem and all dynamically created objects are lost on a restart of the system, the compiled script objects may be converted into a string (serialized) and stored in a file on the server. After a restart, the software detects that the object does not exist in memory and then gets a copy from the file system (if it exists there). If the file exists, then the object is recreated in memory without re-building the script from scratch.

A tag interaction methodology. As mentioned above, this methodology includes a defined architecture for allowing tags/sub-tags to pass information to each other and to manage dependencies between tags if necessary. One of the key benefits of the new script generation engine disclosed herein is that nonlinear syntaxes can be massaged into a set of linear code that is designed to execute in the correct ordering to allow dependencies to be managed correctly. For example, the following syntax would not work prior to the new engine: [LL_REPTAG_&nodeID NODEINFO: [LL_REPTAG_&select/]

This syntax attempts to use a specific type of tag as a parameter for a sub-tag that is being used in another tag of the same type. The new engine builds the compiled output script using a syntax that allows any tag to use any other tag as a dependency. One of the ways that the new engine implements this is through a chaining technique. To illustrate this, the following excerpt shows the script that would be generated from the tag syntax shown above:

s+=stp.SetData(stp.GetParameter("nodeID")).NO-DEINFO({stp.GetParameter("select")}).Get Data( )

In this example, "stp" is a variable that points to a tag processor object described above. The tag processor object is used here to allow the passing of data from tag to sub-tag to tag in a controlled and organized way. The SetData script is provided with input from another stp script that looks up a request parameter (this is what the [LL_REPTAG_& type tag does) and stores it as the .fData feature described above. This function returns the tag processor object and then invokes a sub-tag called NODEINFO. This sub-tag is passed the value of another tag which could in turn have sub-tags of its own. This approach to managing the inputs and outputs of different tags and sub-tags allows for virtually any interaction to be managed correctly, in conjunction with the iteration building approach described earlier.

Embodiments described above can provide many advantages and benefits. For example, a business user friendly interface can be used without compromising platform performance or efficiency. This means that a user interface can be adapted directly to a particular platform without requiring any developers to have specific platform knowledge or knowledge of proprietary programming languages or architectures.

With the new SSGE framework, all developed applications can be highly optimized for a given system. The SSGE framework allows the engine developer to adapt the SSGE framework architecture so that the template developers gain the benefit for a given platform. Optimization is no longer dependent on programmer knowledge and understanding of system performance.

Additionally, platform software upgrades can be managed through the release of a new version of the script generation engine in which tag/sub-tag objects are tailored to the new platform software. This allows all applications for all customers on a given platform to move their applications to a new software release by upgrading the engine version and removes the need for their applications to be re-coded for the new platform version.

Furthermore, the new script building algorithm removes processing order issues that were inherent in the existing legacy algorithm. With this new algorithm, it is now possible to use any tag that returns data as an input for any other tag to a virtually unlimited number of levels. This modular, extendible tag/sub-tag architecture allows other modules and software applications alike to add new tag/sub-tag functionality to the SSGE framework. Each new tag will generate its own script, documentation and even test cases. Documentation for tags/sub-tags and associated features is encapsulated within objects.

The algorithm enables faster, more efficient execution of the solution than by previous methods where a template is interpreted at runtime. In the example OTCS platform, when the new script generation engine is active, a user experiences performance improvements when a new report is created via the WebReports module where report views are dynamically parsed, built into Oscript scripts, compiled, and cached so that only a minimum amount of execution is required at run-time.

The new SSGE framework allows any output specification interface (e.g. tags in a template) to be easily converted into an efficient, appropriate executable script regardless of the positioning, ordering and or any dependencies in the interface syntax.

Although the invention has been described with respect to specific embodiments thereof, these embodiments are merely illustrative, and not restrictive of the invention. For example, the SSGE framework could be adapted for other types of platforms and is not limited to the example OTCS platform. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
   receiving, by a script generator of a content management system, an output specification template for a view of a dynamic document or a software module specific to a content server platform;
   converting, by the script generator, the output specification template into platform-specific script code that is specific and native to the content server platform and that interfaces with features of the content server platform;
   compiling, by the script generator, the platform-specific script code that is specific and native to the content server platform to generate or update a compiled script object which is executable by the content server platform;
   storing, by the script generator in a memory structure, the compiled script object containing the platform-specific script code that is specific and native to the content server platform; and
   subsequent to the storing of the compiled script object in the memory structure, upon receipt of a request for the dynamic document or the software module, producing, from the compiled script object, the requested view of the dynamic document or the software module specific to the content server platform.

2. The method according to claim 1, wherein the output specification template comprises tags and sub-tags and wherein the converting comprises:
   parsing a framework file containing static script syntax with insertion points, wherein each of the insertion points is associated with an iteration number; and
   parsing the output specification template according to the iteration number, the parsing the output specification template including processing each of the tags and sub-tags in the output specification template for a corresponding script text or string; and
   inserting the corresponding script text or string into a corresponding insertion point in the framework file.

3. The method according to claim 2, wherein an insertion point indicates a location in the framework file for insertion of a script text or string tagged in the output specification template.

4. The method according to claim 1, wherein the platform-specific script code comprises a framework file and wherein the converting comprises:
   breaking down the output specification template into pieces;
   locating tags in the pieces;
   for each respective tag located in the pieces, looking up the respective tag in a tag subsystem;
   obtaining, from the tag subsystem, a chunk of script associated with the respective tag; and
   inserting the chunk of script into the framework file at a location associated with the respective tag.

5. The method according to claim 1, wherein the platform-specific script code comprises a framework file, wherein the framework file contains static script syntax and dynamically inserted chunks of script associated with tags and sub-tags in the output specification template.

6. The method according to claim 5, wherein the compiling comprises compiling the framework file after the framework file is processed to include the dynamically inserted chunks of script associated with the tags and sub-tags in the output specification template.

7. The method according to claim 1, further comprising:
creating a unique key for the compiled script object, the unique key referencing the output specification template; and
adding the compiled script object to a compiled script subsystem using the unique key.

8. A system, comprising:
a processor;
a non-transitory computer-readable medium; and
stored instructions translatable by the processor for:
receiving an output specification template for a view of a dynamic document or a software module specific to a content server platform;
converting the output specification template into platform-specific script code that is specific and native to the content server platform and that interfaces with features of the content server platform;
compiling the platform-specific script code that is specific and native to the content server platform to generate or update a compiled script object which is executable by the content server platform;
storing, in a memory structure, the compiled script object containing the platform-specific script code that is specific and native to the content server platform; and
subsequent to the storing of the compiled script object in the memory structure, upon receipt of a request for the dynamic document or the software module, producing, from the compiled script object, the requested view of the dynamic document or the software module specific to the content server platform.

9. The system of claim 8, wherein the output specification template comprises tags and sub-tags and wherein the converting comprises:
parsing a framework file containing static script syntax with insertion points, wherein each of the insertion points is associated with an iteration number; and
parsing the output specification template according to the iteration number, the parsing the output specification template including processing each of the tags and sub-tags in the output specification template for a corresponding script text or string; and
inserting the corresponding script text or string into a corresponding insertion point in the framework file.

10. The system of claim 9, wherein an insertion point indicates a location in the framework file for insertion of a script text or string tagged in the output specification template.

11. The system of claim 8, wherein the platform-specific script code comprises a framework file and wherein the converting comprises:
breaking down the output specification template into pieces;
locating tags in the pieces;
for each respective tag located in the pieces, looking up the respective tag in a tag subsystem;
obtaining, from the tag subsystem, a chunk of script associated with the respective tag; and
inserting the chunk of script into the framework file at a location associated with the respective tag.

12. The system of claim 8, wherein the platform-specific script code comprises a framework file, wherein the framework file contains static script syntax and dynamically inserted chunks of script associated with tags and sub-tags in the output specification template.

13. The system of claim 12, wherein the compiling comprises compiling the framework file after the framework file is processed to include the dynamically inserted chunks of script associated with the tags and sub-tags in the output specification template.

14. The system of claim 8, wherein the stored instructions are further translatable by the processor for:
creating a unique key for the compiled script object, the unique key referencing the output specification template; and
adding the compiled script object to a compiled script subsystem using the unique key.

15. A computer program product comprising a non-transitory computer-readable medium storing instructions translatable by a processor for:
receiving an output specification template for a view of a dynamic document or a software module specific to a content server platform;
converting the output specification template into platform-specific script code that is specific and native to the content server platform and that interfaces with features of the content server platform;
compiling the platform-specific script code that is specific and native to the content server platform to generate or update a compiled script object which is executable by the content server platform;
storing, in a memory structure, the compiled script object containing the platform-specific script code that is specific and native to the content server platform; and
subsequent to the storing of the compiled script object in the memory structure, upon receipt of a request for the dynamic document or the software module, producing, from the compiled script object, the requested view of the dynamic document or the software module specific to the content server platform.

16. The computer program product of claim 15, wherein the output specification template comprises tags and sub-tags and wherein the converting comprises:
parsing a framework file containing static script syntax with insertion points, wherein each of the insertion points is associated with an iteration number; and
parsing the output specification template according to the iteration number, the parsing the output specification template including processing each of the tags and sub-tags in the output specification template for a corresponding script text or string; and
inserting the corresponding script text or string into a corresponding insertion point in the framework file.

17. The computer program product of claim 15, wherein the platform-specific script code comprises a framework file and wherein the converting comprises:
breaking down the output specification template into pieces;
locating tags in the pieces;
for each respective tag located in the pieces, looking up the respective tag in a tag subsystem;
obtaining, from the tag subsystem, a chunk of script associated with the respective tag; and
inserting the chunk of script into the framework file at a location associated with the respective tag.

18. The computer program product of claim 15, wherein the platform-specific script code comprises a framework file, wherein the framework file contains static script syntax and dynamically inserted chunks of script associated with tags and sub-tags in the output specification template.

19. The computer program product of claim 18, wherein the compiling comprises compiling the framework file after the framework file is processed to include the dynamically inserted chunks of script associated with the tags and sub-tags in the output specification template.

20. The computer program product of claim 15, wherein the instructions are further translatable by the processor for:
   creating a unique key for the compiled script object, the unique key referencing the output specification template; and
   adding the compiled script object to a compiled script subsystem using the unique key.

* * * * *